Patented May 8, 1934

1,957,861

UNITED STATES PATENT OFFICE 1,957,861

CELLULOSE ACETATE COMPOSITION CONTAINING A MIXTURE OF ISOMERIC CRESYL TOLUENE SULPHONATES

Ernest R. Taylor, Rochester, N. Y., assignor to Eastman Kodak Company, Rochester, N. Y., a corporation of New York No Drawing. Application October 20, 1932, Serial No. 638,781

15 Claims. (Cl. 106—40)

This invention relates to compositions of matter in which cellulose organic esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which are capable of easy and convenient manipulation in the plastic and analogous arts, such as in the manufacture of sheets, films, artificial silk filaments, varnishes, lacquers and the like, and to produce compositions which will not injure, or be injured by, the substances or surfaces with which they are associated during manufacture. Another object of my invention is to produce compositions which can be molded at elevated temperatures and high pressures to produce plastic products having desirable properties. Still another object of my invention is to produce compositions of matter containing cellulose acetate which have a high degree of flexibility, softness, pliability and clarity. Other objects will become apparent to those skilled in the art to which this invention pertains.

While cellulose acetate has been known for decades, it has also been known that to utilize it in the various plastic arts it is necessary to mix therewith such plasticizing or conditioning agents as triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition agents for the same or similar purposes are also added to cellulose acetate to prepare it for use in the other plastic arts, such as in the manufacture of lacquers, varnishes, artificial silk filaments and the like. While the plasticizers or other addition agents heretofore discovered have had their utility in the art, the increasing use to which cellulose acetate has been put, and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not sufficiently compatible with cellulose acetate to be used as plasticizers in cellulose acetate compositions.

It has been known to use o-cresyl p-toluene sulphonate as a plasticizer for cellulose acetate, as disclosed in U. S. Patent #1,560,542. I have discovered, however, that a mixture of o-, m- and p-cresyl o- and p-toluene sulphonates has very decided advantages over o-cresyl p-toluene sulphonate as a plasticizer for cellulose acetate and other organic esters of cellulose. Ortho-cresyl p-toluene sulphonate is ordinarily prepared from o-cresol and p-toluene sulphochloride. This involves the preliminary separation of o-cresol from m- and p-cresol as they occur together in crude cresol, and of p-toluene sulphochloride from the o-toluene sulphochloride which is formed with it in its manufacture. The mixture of isomeric cresyl toluene sulphonates which can be prepared from crude cresol and the mixed o- and p-toluene sulphochlorides is, of course, cheaper than o-cresyl p-toluene sulphonate. It is a liquid at ordinary temperatures, whereas o-cresyl p-toluene sulphonate is solid up to about 52° C. For this reason the mixture of isomers can be incorporated into cellulose ester compositions with greater ease than o-cresyl p-toluene sulphonate. Furthermore, the mixture of isomers shows much greater compatibility with cellulose organic esters, as, for instance, cellulose acetate, than does o-cresyl p-toluene sulphonate, it being possible to incorporate approximately twice as much of the mixture of isomers as of o-cresyl p-toluene sulphonate with a given amount of cellulose organic esters, such as cellulose acetate. Not only does this make possible the manufacture of sheets containing more plasticizer, and hence more flexible, than can be obtained with o-cresyl p-toluene sulphonate, but sheets containing a moderate amount of plasticizer are more stable when the more compatible mixture of isomers is used than when o-cresyl p-toluene sulphonate is used. For instance, when an amount of o-cresyl p-toluene sulphonate between 35 and 60% (parts by weight based on the cellulose acetate) is incorporated in a cellulose acetate sheet, some of the plasticizer crystallizes out when the sheet is subjected to low temperatures, resulting in loss of clarity of the sheet. On the other hand, a cellulose acetate sheet containing the same amount of a mixture of o-, m- and p-cresyl o- and p-toluene sulphonates remains perfectly clear when subjected to the same low temperatures.

In order that those skilled in this art may better understand my invention I would state, by way of illustration, that for the manufacture of photographic film or other sheets my new compositions of matter may be compounded as follows: 100 parts of acetone-soluble cellulose acetate, i. e. cellulose acetate containing from 36% to 42% acetyl radical, approximately, is dissolved with stirring at atmospheric temperature in 300 to 500 parts, preferably 400 parts, by weight, of acetone. To this solution may be added from 10 to 50 parts by weight of a mixture of o-, m- and p-cresyl o- and p-toluene sulphonates, approximately. The amount of plasticizer may be decreased or increased, depending upon whether it is desired to decrease or increase, respectively, the properties which this plasticizer contributes to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A sheet so produced has permanently brilliant transparency and low inflammability, burning no more readily than ordinary newsprint. Films produced in accordance with my invention are tough and flexible, and maintain flexibility in a superior fashion, indicating that films so plasticized will withstand ordinary usage satisfactorily for many years.

Other similar solvents (instead of acetone) which are compatible with the cellulose acetate and my new plasticizer will also occur to those skilled in this art, such as ethylene chloride-alcohol mixtures. In like manner this plasticizer may be compounded with other single organic esters of cellulose, such as cellulose propionate, butyrate, stearate and the like, or with mixed organic esters, such as cellulose aceto-propionate, cellulose aceto-butyrate, cellulose aceto-lactate, cellulose aceto-tartrate, or cellulose aceto-stearate, a suitable solvent which will dissolve both the cellulosic derivative and the plasticizer being employed, such, for instance, as an alkylene chloride with or without the addition of alcohol.

Inasmuch as my above-described compositions of matter are useful in the production of films and sheets, it will be apparent that my new plasticizer may also be employed with advantage in the other branches of the plastic art. For instance, my above-described compositions of matter may be employed in the manufacture of artificial silk by the dry spinning method. With the proper coagulating bath they may also be employed for wet spinning. It may be desired to employ compositions of different viscosity or evaporation characteristics, but this is a mere matter of changing the solvent proportion or adding evaporation retardents or other high or intermediate boiling constituents, as has been well known in the art for more than a decade. My novel plasticizer may also be employed with advantage in connection with a number of the known lacquer and varnish formulæ with which it may be found to be compatible. In such cases the plasticizer is usually first put into solution in the cellulose derivative solution, and if non-solvents are added for the purpose of cheapening the composition they are added only to such an extent as will not precipitate the derivative from solution. Also the plasticizer is usually employed in rather large amounts in compounding lacquers. Other uses within the scope of my invention will also suggest themselves to those skilled in the art and are to be included within the scope of the claims appended hereto.

A mixture of o-, m- and p-cresyl o- and p-toluene sulphonates may also be advantageously used as a plasticizer in cellulose organic ester molding compositions. For instance, when about 30% (parts by weight based on the cellulose ester) of a mixture of o-, m- and p-cresyl o- and p-toluene sulphonates is homogeneously mixed with cellulose acetate-propionate, the mixture may be converted into a hard, transparent plastic product by molding at a temperature of 140°–160° C. and a pressure of from 2500 to 4000 pounds per square inch for a period of from 2 to 5 minutes, in a manner already known to those skilled in molding compounds of that nature. In like manner this plasticizer may be used for molding other organic esters of cellulose, such, for instance, as cellulose acetate, cellulose propionate, cellulose butyrate, etc.

I have found that, upon the addition to cellulose acetate of approximately 100% (parts by weight based on the weight of cellulose acetate) of a mixture of o-, m- and p-cresyl o- and p-toluene sulphonates, quite unexpected compatibility of the plasticizer with the cellulose acetate exists and also that quite unexpected flexibility and plasticity of the final product results. Contrary to experience in most cases where such a large proportion of plasticizer is used, no exudation or crystallizing out of the plasticizer occurs. This compatibility of the mixture of isomers is the more surprising inasmuch as 50% is the practical upper limit of the amount of o-cresyl p-toluene sulphonate which can be incorporated in cellulose acetate without blushing or crystallization taking place. Sheets deposited from cellulose acetate compositions containing approximately 100 parts by weight of my mixture of isomeric cresyl toluene sulphonates per 100 parts of cellulose acetate show excellent clarity and extremely high flexibility, withstanding over 40 folds on the modified Schopper fold-tester commonly employed in testing cellulose derivative sheeting, whereas an unplasticized cellulose acetate film withstood only 3 folds. Such compositions have great utility where a highly flexible compound is desired, such as in the coating of a base (for instance, cloth or other fabric) in the production of artificial leather, or in the production of relatively thin sheets wherein more than the usual flexibility is important.

These novel compositions of matter are produced by merely mixing the plasticizer with cellulose acetate and then adding sufficient of a common solvent, such as acetone, whereupon an intimate mixture of the plasticizer with the cellulose acetate results. The amount of acetone or other common solvent to be employed varies, of course, within rather wide limits depending upon the fluidity of the composition desired. 100 parts of acetone will suffice for many purposes, although I prefer to use 400 parts. Various high boilers or evaporation retardents, such as ethyl lactate, amyl acetate or the like may also be added if desired, as is well known in this art.

The compositions of matter so produced may then be coated into sheets in the usual way by depositing them upon plates or rolls and permitting the solvent to evaporate. If my novel compositions are to be employed in the manufacture of artificial leather, they may be coated upon, for instance, a cloth support and the solvent permitted to evaporate, or the cloth support may be caused to pass through the cellulose acetate-plasticizer composition and permitted to absorb the solution, the solvent in the coating being then permitted to evaporate. In either case, the solvent may, of course, be recovered if desired by condensing the vapors, etc.

While above and in certain of the claims appended hereto, I have referred to the use of a plasticizer in approximately equal proportions, namely in a ratio of approximately 100%, it will be understood that within this terminology variations of from 10% to 15% less than 100% of plasticizer and as much as 25% to 50% more than 100% of the plasticizer may in some instances be desirable.

While I have referred to a mixture of o-, m- and p-cresyl o- and p-toluene sulphonates, I have found that the same advantages may be obtained with a mixture of a smaller number of isomers, for instance with a mixture of o-cresyl o- and p-toluene sulphonates. A mixture of a larger number of isomers may also be used.

What I claim as my invention and desire to be secured by Letters Patent of the United States is:

1. A composition of matter comprising an organic ester of cellulose and a mixture of isomeric cresyl toluene sulphonates.

2. A composition of matter comprising an organic ester of cellulose and a mixture of o-, m- and p-cresyl o- and p-toluene sulphonates.

3. A composition of matter comprising cellulose acetate and a mixture of isomeric cresyl toluene sulphonates.

4. A composition of matter comprising cellulose acetate and a mixture of o-, m- and p-cresyl o- and p-toluene sulphonates.

5. A composition of matter comprising cellulose acetate-propionate and a mixture of o-, m- and p-cresyl o- and p-toluene sulphonates.

6. A composition of matter comprising 100 parts of cellulose acetate and about 10 to 100 parts, by weight, of a mixture of isomeric cresyl toluene sulphonates.

7. A composition of matter comprising 100 parts of cellulose acetate and about 10 to 100 parts, by weight, of a mixture of o-, m- and p-cresyl o- and p-toluene sulphonates.

8. A composition of matter comprising 100 parts of cellulose acetate and about 100 parts, by weight, of a mixture of o-, m- and p-cresyl o- and p-toluene sulphonates.

9. A molding composition adapted to molding under elevated temperatures and high pressures, comprising an organic ester of cellulose and a mixture of isomeric cresyl toluene sulphonates.

10. A molding composition adapted to molding under elevated temperatures and high pressures, comprising cellulose acetate and a mixture of o-, m- and p-cresyl o- and p-toluene sulphonates.

11. A molding composition adapted to molding under elevated temperatures and high pressures, comprising cellulose acetate-propionate and a mixture of o-, m- and p-cresyl o- and p-toluene sulphonates.

12. A flexible, transparent sheet comprising 100 parts of a cellulose organic ester and about 10 to 100 parts, by weight, of a mixture of isomeric cresyl toluene sulphonates.

13. A flexible, transparent sheet comprising 100 parts of a cellulose organic ester and about 10 to 100 parts, by weight, of a mixture of o-, m- and p-cresyl o- and p-toluene sulphonates.

14. A flexible, transparent sheet comprising 100 parts of cellulose acetate and about 10 to 100 parts, by weight, of a mixture of o-, m- and p-cresyl o- and p-toluene sulphonates.

15. A flexible, transparent sheet comprising 100 parts of cellulose acetate-propionate and about 10 to 100 parts, by weight, of a mixture of o-, m- and p-cresyl o- and p-toluene sulphonates.

ERNEST R. TAYLOR.